April 24, 1945.　　　H. C. HARBERS　　　2,374,196

MOTOR VEHICLE CHASSIS FOR TANKS

Filed Feb. 24, 1942　　　3 Sheets-Sheet 2

HENRY C. HARBERS,
INVENTOR.

BY Edwin D. Jones,
ATTORNEY

April 24, 1945.   H. C. HARBERS   2,374,196
MOTOR VEHICLE CHASSIS FOR TANKS
Filed Feb. 24, 1942   3 Sheets-Sheet 3

Henry C. Harbers,
INVENTOR.

BY Edwin D. Jones
ATTORNEY

Patented Apr. 24, 1945

2,374,196

UNITED STATES PATENT OFFICE 2,374,196

MOTOR VEHICLE CHASSIS FOR TANKS

Henry C. Harbers, San Gabriel, Calif., assignor to C. B. Equipment Co., Los Angeles, Calif., a co-partnership Application February 24, 1942, Serial No. 432,112

5 Claims. (Cl. 180—23)

My invention relates generally to motor vehicles, and more particularly to a chassis therefor which is especially adapted for tanks as used in warfare.

It is a purpose of my invention to provide a motor vehicle chassis for tanks, which is characterized in the main by an eight wheel driving means by which high speeds of travel may be obtained, and steering mechanisms in association therewith by which a high degree of maneuverability is attained.

It is also a purpose of my invention to provide a motor vehicle chassis for tanks, which embodies eight wheels arranged in two groups disposed at opposite ends of the vehicle frame and all of which are positively driven through differential mechanisms, and all of which are mounted to move independently of each other in a manner to compensate for terrain irregularities, all to the end of providing a tank which can traverse almost any character of terrain at a speed in excess of present tanks either of the crawling or wheel type, and thereby render the tank extremely advantageous for use in warfare.

A further purpose of my invention is a provision of an eight wheel drive vehicle, wherein each set of four wheels is embodied in a truck unit, and either or both of the truck units are turnable in relation to the vehicle frame, and either or both are provided with a steering mechanism.

Another purpose of my invention is to provide one fluid pressure brake mechanism for the wheels of the rear truck unit with a single control means therefor to effect an application simultaneously of the brakes of all four wheels, and another fluid pressure brake mechanism for the wheels of the front truck unit, with two control means for effecting application of the brakes for the two wheels at one side of the truck unit independently of an application of the brakes for the two wheels at the other side of the truck, and wherein the two control means are correlated to permit simultaneous operation in effecting simultaneous application of the brakes for all four wheels.

I will describe only two forms of motor vehicle chassis for tanks, each embodying my invention, and will then point out the novel features thereof in claims.

In the accompanying drawings:

Fig. 5 is a view showing diagrammatically the fluid pressure brake operating means adapted for incorporation in the motor vehicle shown in Figs. 1 and 9.

Fig. 6 is a schematic view, partly in section, showing one form of hydraulic steering system for the front truck unit of the chassis shown in Fig. 1, or the front and rear truck units of the chassis shown in Fig. 9.

Fig. 7 is a view similar to Fig. 6, but fragmentary, and illustrating other positions of the valves of the system by which the pressure fluid is maintained static in the cylinder of the system for holding the truck unit in a fixed steering position.

Fig. 8 is a view similar to Fig. 7 showing another position of the valves by which the piston of the ram is moved in the opposite direction from the direction of movement effected when the valves are in the position as shown in Fig. 6.

Fig. 9 is a view similar to Fig. 1 showing another form of motor vehicle chassis for tanks embodying my invention.

Similar reference characters refer to similar parts in each of the several views.

Figure 1:
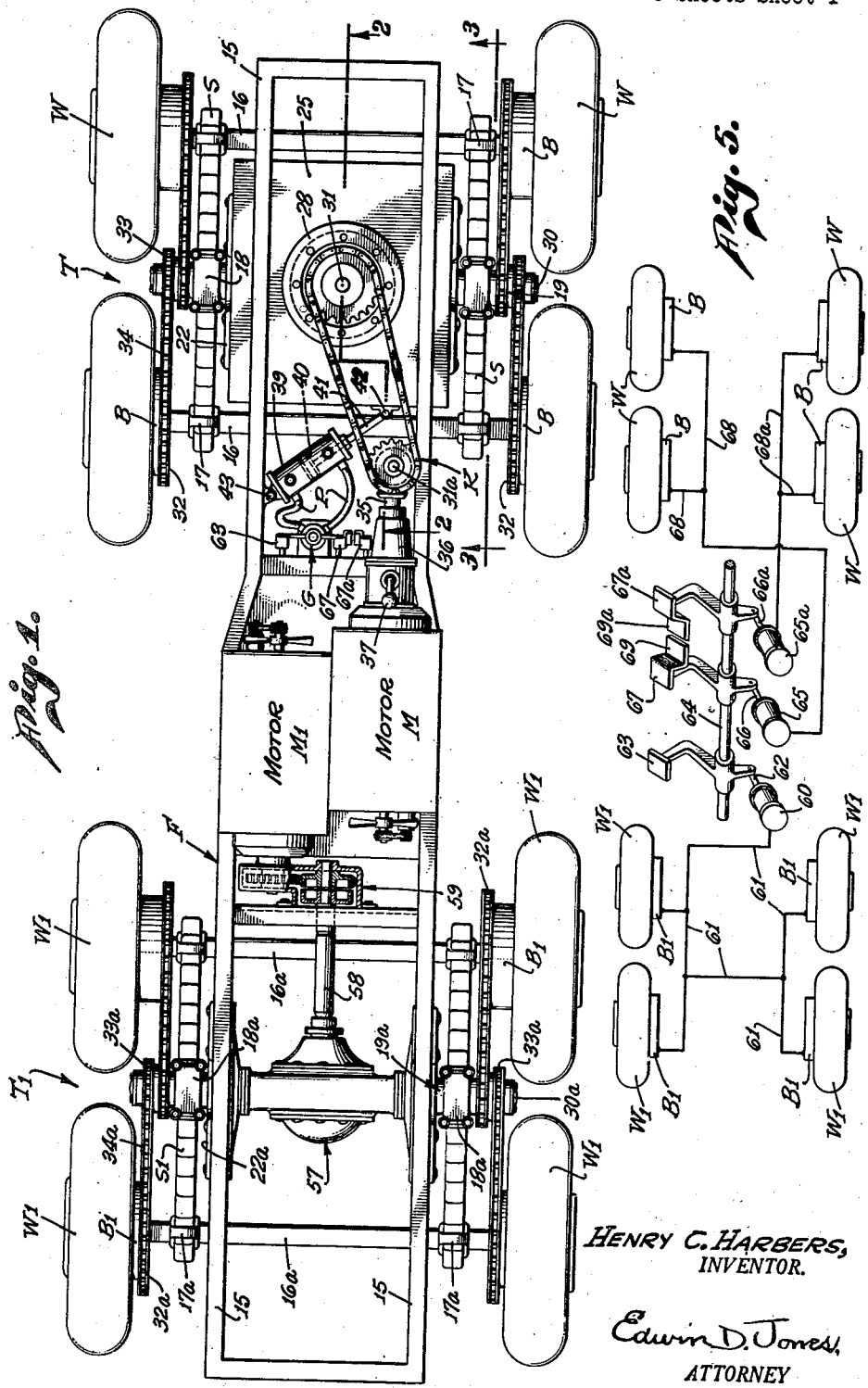
Fig. 1 is a view showing in top plan one form of motor vehicle chassis embodying my invention.

Referring first to the form of my invention shown in Fig. 1, the vehicle chassis comprises a rectangular frame F including two side members 15 which are bent inwardly to reduce the width of the frame at the front portion thereof to allow for adequate steering of the front wheels of the vehicle. The frame F is supported at its front end by a front truck unit T and at its rear end by a rear truck unit T1.

The front truck unit T comprises two axles 16 one in advance of the other and extending transversely of the frame F. On opposite ends of each axle are journaled wheels W, and each of these wheels may be provided with any conventional form of fluid pressure operated brake indicated at B.

Figure 2:
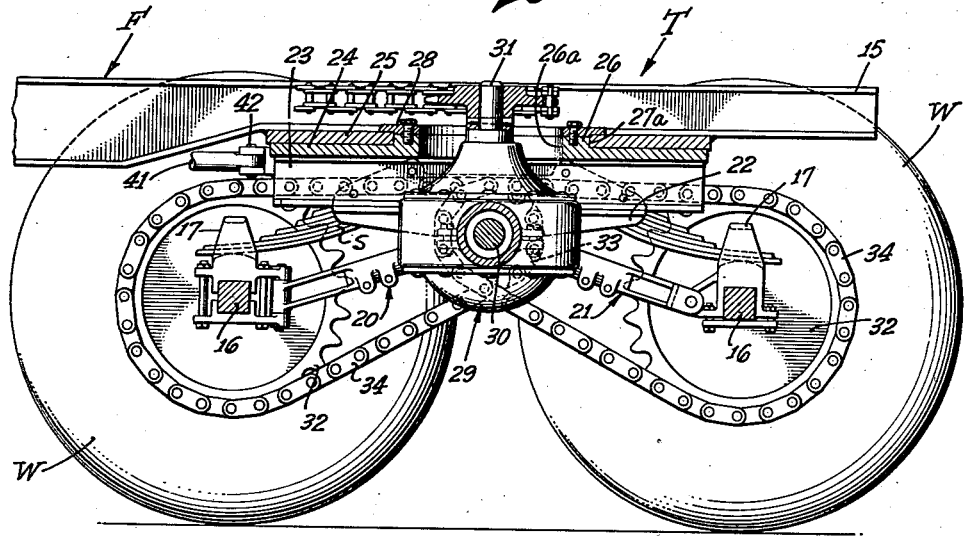
Fig. 2 is an enlarged vertical sectional view taken on the line 2—2 of Fig. 1 and looking in the direction of the arrows.

The axles 16 are mounted on a pair of leaf springs S, through stirrups 17 secured to the axles and in which the ends of the springs loosely engage, as best shown in Fig. 2. The springs S in turn are secured in saddles 18 pivotally mounted on a pair of housings 19, and whereby the springs are mounted for rocking movements to in turn allow the axles to move vertically in relation to the frame F. Such movement of the axles is restrained to vertical arcs by torque rods 20 connected to the axles and to the saddles 18 as shown. Radius rods 21 may also be provided and connected to the axles and saddles as shown.

The housings 19 are secured to and supported by a pair of brackets 22 fixed to a pair of beams 23 which are in turn secured to the under side of a plate 24. This plate is mounted for rotation beneath the frame F by an upper plate 25 fixed to the frame members 15. The fixed plate 25 supports the rotatable plate 24 and centers the latter thereon, by an annular shoulder 26 on the plate 24 surrounding an opening 26a therein and rotatably fitted in an opening 27a of the plate 25, and having secured thereto a flat ring 28 which overhangs the plate 25 to suspend the plate 24 therefrom.

Manifestly, the structure just described constitutes a fifth wheel connection between the frame F and the truck unit T, whereby the latter is rotatable relatively to the frame.

At their confronting ends the housings 19 are connected by a housing 29 for a differential mechanism (not shown because it is conventional), which is employed to drivingly connect a pair of jack shafts 30 to a drive shaft 31 which rises vertically from the housing 29 through the openings 26a and 27a of the plates 24 and 25.

From the jack shafts 30 all four wheels W are adapted to be driven through chain and sprocket mechanisms, one for each of the wheels. As shown in Figs. 1 and 2, each wheel is provided with a sprocket 32 driven from a sprocket 33 by a chain 34. The sprockets 33 are fixed in pairs to the outer ends of the jack shafts 30 where they project from the ends of the housings 19.

The drive shaft 31 may be driven by a chain and sprocket connection K with a second vertical shaft 31a disposed rearwardly and to one side of the shaft 31 and operatively connected to a horizontal shaft 35 which extends into a housing 36 for a conventional variable speed transmission mechanism, whereby the shaft 35 may be driven at any desired speed by shifting of the transmission gears through a lever 37. The transmission mechanism is in turn driven by a motor M suitably mounted on the frame F.

Manifestly, the front truck unit as described, is of such construction that the wheels W can oscillate about the jack shafts as a center to permit them to move independently through vertical arcs and thus compensate for terrain irregularities. Where the wheels are provided with chain and sprocket mechanisms, these free and independent wheel actions can occur without interfering with the positive drive of the wheels provided by such mechanisms. Also, through provision of the fifth wheel connection between the frame F and truck unit T, the latter is rendered movable to permit steering of the wheels W in effecting steering of the vehicle as a whole. Steering movements of the truck unit are about the shaft 31 as a center, so that irrespective of the steering position of the truck unit, the chain and sprocket connection C provides at all times a positive driving means for all four wheels of the truck.

For steering the truck unit a fluid pressure operated mechanism is desirable because of the load involved in the adaptation of the chassis to a tank carrying guns of large caliber. Also because to effect steering all four wheels must be moved laterally against the resistance offered by the traction of the tires. Such steering mechanism may comprise (Figs. 1 and 6) a gear pump 38 for supplying liquid under pressure to either end of the cylinder 39 of a ram for moving a piston 40 in either direction therein to reciprocate a rod 41 pivotally connected, as at 42, to the lower plate 24 of the fifth wheel connection. The cylinder 39 is pivoted as at 43 on the frame F to allow the necessary lateral movement of the rod 41 in turning the truck unit either direction.

A simple hydraulic system by which pressure fluid from the gear pump can be conveyed to and from the cylinder in effecting those controlled movements of the piston rod 41 necessary to controlled steering of the front truck unit, is illustrated in Figs. 6, 7 and 8. As here shown the system comprises a primary valve structure V including a valve 44 having two parts 45 and 46 and rotatable in a casing 47.

Also, two secondary valve structures V1 and V2 are provided. The structure V1 comprises a casing 48 in which a valve 49 is rotatable. This valve is formed with a T-shape port 50. The structure V2 comprises, similarly, a casing 51 in which a valve 52 is rotatable, and this valve is formed with a T-shape port 53. Pipes P in the required arrangement connect the pump to valve casing 47, the casing 47 to the valve casings 48 and 51, and the latter to opposite ends of the cylinder 39. Branch pipes 54 and 55 having check valves C and C1 therein, connect the casings 48 and 51 to those pipes leading to opposed ends of the cylinder. Finally, a cross pipe 56 connects the two casings 48 and 51 to each other.

In operation of the hydraulic system just described, liquid from the high pressure side H of the pump 38 may be supplied to the left hand end of the cylinder 39 (Fig. 6) for moving the piston 40 to the right, when the valves 44, 49, and 52 are in the positions shown in Fig. 6, the flow of the liquid to the cylinder being defined by the arrows. Liquid from the cylinder 39 at the other side of the piston returns to the low pressure side L of the pumps as indicated by the arrows.

After the piston has been moved by the liquid to that position necessary to turn the front truck unit to the desired steering position, the piston and the truck unit may be held against movement by turning the valves 49 and 52 to the positions shown in Fig. 7, thus discontinuing liquid flow to and from the cylinder 39, and causing it to describe the path indicated by the arrows in Fig. 7, wherein it continues to be circulated by the pump.

When desiring to move the piston 40 to the left, as when viewed in Fig. 6, to rotate the front truck T in the other direction, the valves 44, 49, and 52 are moved to the positions shown in Fig. 8, thereby causing the liquid from the high pressure side of the pump 38 to enter the cylinder at the right of the piston, as indicated by the arrows in Fig. 8. Meanwhile, liquid at the other side of the piston is returned to the pump as indicated by the arrows. It will be understood that the piston may be checked in its movement to the left and held in any required position, by returning the valves 44, 49, and 52 to the positions shown in Fig. 7.

In practise, the valves 44, 49 and 52 and their casings may be incorporated in a column-like structure G (Fig. 1) positioned for convenient operation by the driver of the vehicle.

Referring again to Fig. 1, the rear truck unit T1 likewise comprises two axles 16a arranged one in advance of the other transversely of the frame F, with wheels W1 journaled on opposite ends of both axles. Each wheel may be provided with a brake B1 for operation by fluid pressure.

As in the front truck unit T, the axles 16a are mounted on a pair of leaf springs 51 through stirrups 17a secured to the axles and in which the ends of the springs loosely engage. At their centers the springs are secured in saddles 18a pivotally mounted on a pair of housings 19a. Thus, the two springs are mounted for rocking movements about the housing 19a, to in turn allow the axles to move vertically in relation to the frame F. The axles are restrained in their movements to vertical arcs by torque rods as in the truck unit T, and likewise radius rods may be provided.

The housings 19a are suspended from the frame F by a pair of brackets 22a secured to the side frame members 15. A housing 57 for a differential mechanism connects the confronting ends of the housings 19a, and each housing 19a contains a jack shaft 30a which is adapted to be driven from a drive shaft 58 through the differential mechanism in the housing 57. The outer ends of the two jack shafts 30a project from the housings 19a, where they are drivingly connected to the four wheels W1 through sprockets 32a and 33a and chains 34a in the same manner as the wheels W of the front truck unit.

To provide additional motive power which is requisite in a tank vehicle to attain high speeds, a separate motor M1 is provided for driving the four wheels W1 of the rear truck unit. This motor is shown as supported in the frame F alongside the motor M, and is drivingly connected to the shaft 58 through a fluid clutch 59 of any conventional form, whereby the use of a gear transmission as for the front truck unit, is avoided, and driving control of the entire vehicle by a single operator, is achieved.

Manifestly, the rear truck unit T1 aside from being incapable of being steered, operates in the same manner as the front truck unit T, in that the wheels W1 are all positively driven, and yet can oscillate about the jack shafts as a center to move independently through vertical arcs, and thus compensate for terrain irregularities.

Referring now to Fig. 5, I have here shown hydraulically operated means for actuating the brakes B and B1 of the wheels W and W1 in a prescribed manner to not only brake the vehicle, but to utilize the brakes for the wheel W as a steering medium for the front truck unit in place of the hydraulic means previously described herein.

There are three of the aforesaid brake operating means. One for the brakes of the rear wheels W1, one for the brakes of those two wheels W at the left side of the front end of the frame F, and one for the brakes of the two wheels W at the right side of the frame.

The first means comprises a master cylinder 60 which, through suitable pipes 61, supplies liquid under pressure to all four ram units (not shown) for the four brakes of the wheels W1, when a master piston rod 62 is actuated by operation of pedal lever 63 fulcrumed on an axle 64.

The second and third means are identical to each other, and they comprise, respectively, a master cylinder 65 or 65a having a piston rod 66 or 66a which, when pushed inwardly of the cylinder by operation of a pedal lever 67 or 67a, supplies liquid under pressure through suitable pipes 68 or 68a to the ram units for the brakes B of the wheels at one side of the frame F or the other, depending upon which pedal lever is operated. The pedal levers may be mounted on the axle 64, and they are provided with extensions 69 and 69a arranged so that they may be simultaneously engaged by the driver's foot to actuate both levers and thereby effect application of all four brakes simultaneously.

From the preceding description it will be clear that the brake operating means for the brakes of the wheels W1 for the rear truck unit, can be actuated independently of the two brake operating means for the brakes of the wheels W for the front truck unit. Also, that the two brake operating means for the wheels W can be actuated separately or together, and together with the operating means for the brakes of the rear wheels W1 when both feet of the driver are employed to depress all three pedals.

The purpose in providing separate operating means for the brakes of the wheels W at opposite sides of the vehicle frame, is to effect, by actuation of one set of brakes or the other, steering of the vehicle under conditions adverse to steering through operation of the hydraulic steering means, as well as to effect more rapid steering as is necessary when making quick and abrupt turns. If it is desired to turn the vehicle to right as when viewed in Fig. 1, then the brakes for the wheels W on the right side of the frame, are applied.

Conversely, when desiring to turn the vehicle to the left, the brakes for the wheels W at the left side of the frame, are applied. Such brake applications may be partial or complete depending upon the arc of turn desired. If the arc of turn desired is short, then the brakes for one pair of front wheels are applied and, under the forward propulsion of the vehicle by the four rear wheels W1 and the turning force exerted by the other two front drive wheels, the vehicle is caused to swing quickly about and in the direction of those two front wheels W which are locked against turning by a brake application.

The hydraulically operated steering means of which the cylinder 39 and the piston rod 41 form a part, may be used in conjunction with the brake operated steering means just described, when, for any reason, the hydraulic pressure generated by the gear pump is insufficient to effect steering movements of the front truck. But the hydraulically operated steering means is primarily designed for steering on paved highways or on fairly hard ground and at relatively high speeds.

When the brake operated steering means alone is employed, the piston of the cylinder 39 must of necessity move in the cylinder in response to turning movement of the front truck unit. To make provision for such piston movement and yet not interfere with the normal operation of the hydraulic system, the cylinder 39 is provided with breather ports 70 adjacent opposite ends thereof (Fig. 6) which are controlled by ball valves 71 spring pressed outwardly to normally close the ports.

When the piston is moved in one direction or the other under turning movement of the front truck unit, and where the valves 44, 49 and 52 are in the positions shown in Fig. 7, so that the cylinder is disconnected from the pump 38, the valves 71 operate as follows:

Under the vacuum created at the suction side of the piston, that valve at the same piston side, opens to allow air to flow into the cylinder, while the force of the liquid created at the pressure side of the piston closes the valve at that piston side, but only after all air has been expelled to atmosphere.

If it is proposed that the hydraulic steering means be at all times used in conjunction with the brake actuated steering means so that the latter assist the former, then the aforedescribed ports 70 and valves 71 may be dispensed with.

Figure 4:
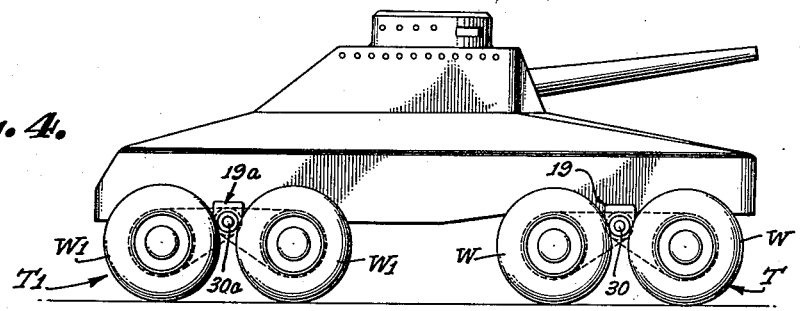
Fig. 4 is a view showing in side elevation the chassis of Fig. 1 incorporated in a tank.
Figure 3:
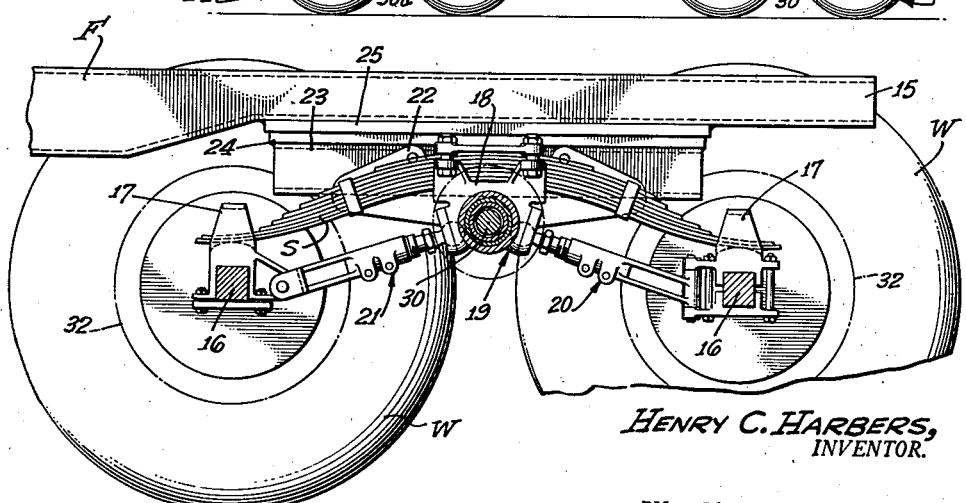
Fig. 3 is a view similar to Fig. 2 and taken on the line 3—3 of Fig. 1.

In Fig. 4, I have shown my motor vehicle chassis incorporated in a tank, the body of which is supported on the frame F, and may be of any suitable construction. A tank so equipped may, because of the oscillatable mounting of the wheels, traverse the most irregular terrain without subjecting the frame and the tank body to intense vibrations and shocks, and thereby promoting accurate aiming of the guns carried thereby while the tank is under way. Also, each truck unit having four wheels all of which are positively driven, and preferably by a separate motor, permits the attainment of extremely high speeds of travel, an important advantage in warfare. Further, the dual steering means for the front truck unit renders the tank highly maneuverable irrespective of the nature of the ground over which the tank is traveling.

In Fig. 9, I have shown another form of vehicle chassis embodying my invention, in which the frame F¹ is supported front and rear by two truck units T² and T³, each of which is of the same construction as the front truck unit T in the first form of my invention, in that it has two axles, four wheels, two springs oscillatable on the jack shaft housings, a fifth wheel connection between the vehicle frame and truck unit to render the unit steerable, and chain and sprocket mechanisms for driving all four wheels from a motor on the frame, irrespective of the steering position occupied by the truck unit. Also, each truck unit is independently steerable by the same hydraulic means as provided for the truck unit T, and thus the vehicle can not only be driven in either direction, but steered in either direction.

The same reference characters have been used in Fig. 9 as in Fig. 1 to indicate similar parts of the vehicle chassis.

Although I have herein shown and described only two forms of motor vehicle chassis for tanks embodying my invention, it is to be understood that various changes and modifications may be made therein without departing from the spirit of my invention and the spirit and scope of the appended claims.

I claim:

1. In a motor vehicle chassis; a main frame; a four wheel truck unit supporting the front end of said main frame and having a fifth wheel rotatably connecting said unit to said main frame to allow steering of the wheels of said unit; two driven shafts for said wheels, carried by said truck unit; a vertically disposed drive shaft having its axis coincident with the axis of rotation of said unit; a single differential mechanism between said drive shaft and said driven shafts; a driving connection between said wheels and said driven shafts; a motor on said main frame; a variable speed transmission mechanism connected to said motor; a counter shaft connected to said mechanism; and a horizontally disposed chain and sprocket connection between said counter shaft and said drive shaft.

2. In a traction vehicle, a main frame, a group of four traction wheels supporting the rear end of said frame, a second group of four traction wheels supporting the front end of said frame, said second group of wheels being connected to said frame through a fifth wheel to provide a steering arrangement for the vehicle, a steering station mounted on said main frame adjacent the front end thereof, two prime movers mounted on the vehicle and arranged side by side, the rear of one of said prime movers being directly operatively connected through a fluid clutch with each of the four wheels supporting the rear end of said frame, and the other of said prime movers being operatively connected through a selective transmission unit with each of the four wheels adjacent the front end of the frame.

3. In a motor vehicle chassis; a main frame; a four wheel truck unit supporting the front end of said frame and having a frame; a pair of coaxial housings secured to and disposed transversely of said frame and having their outer ends projecting beyond the sides of said unit frame; a pair of spring saddles pivotally mounted on the projecting ends of said housings; a pair of leaf springs secured to said saddles for oscillation about said housings as a center; a pair of one-piece axles longitudinally spaced and supported by the ends of said springs; means correlated with said housings, said springs and said axles for securing the latter from shifting longitudinally and laterally; wheels on the ends of said axles; driven shafts in said housings and projecting from the outer ends thereof; a drive shaft; a single differential mechanism between said drive shaft and the inner ends of said driven shafts; chain and sprocket connections between the outer ends of said driven shafts and said wheels; a fifth wheel connecting said main frame to said unit frame so that the latter is rotatable about a vertical axis intersecting and perpendicular to the horizontal axis of said mechanism; means on said main frame and connected with said unit frame for rotating the latter to effect steering of said unit; and a motor on the vehicle chassis so operatively connected to said drive shaft as to drive the latter in any steering position of said unit, said drive shaft extending vertically upward from said differential and being located in the axis of said fifth wheel.

4. In a motor vehicle chassis; a main frame; a four wheel truck unit supporting the front end of said frame and having a frame; a pair of coaxial housings secured to and disposed transversely of said frame and having their outer ends projecting beyond the sides of said unit frame; a pair of spring saddles pivotally mounted on the projecting ends of said housings; a pair of leaf springs secured to said saddles for oscillation about said housings as a center; a pair of one-piece axles longitudinally spaced and supported by the ends of said springs; means correlated with said housings, said springs and said axles for securing the latter from shifting longitudinally and laterally; wheels on the ends of said axles; driven shafts in said housings and projecting from the outer ends thereof; a drive shaft; a single differential mechanism between said drive shaft and the inner ends of said driven shafts; chain and sprocket connections between the outer ends of said driven shafts and said wheels; a fifth wheel connecting said main frame to said unit frame so that the latter is rotatable about a vertical axis intersecting and perpendicular to the horizontal axis of said mechanism; means on said main frame and connected with said unit frame for rotating the latter to effect steering of said unit; and a motor mounted on said main frame and so operatively connected to said drive shaft as to drive the latter in any steering position of said unit, said drive shaft extending vertically upwardly from the differential and being located in the axis of said fifth wheel.

5. In a motor vehicle chassis; a main frame; a four wheel truck unit supporting the front end of said frame and having a frame; a pair of co-axial housings secured to and disposed transversely of said frame and having their outer ends projecting beyond the sides of said unit frame; a pair of elements pivotally mounted on the projecting ends of said housing; a pair of members secured to said elements for oscillation about said housings as a center; rigid axles longitudinally spaced on said unit frame and supported by the ends of said members; wheels on said axles; driven shafts in said housings and projecting from the outer ends thereof; a drive shaft; a differential mechanism between said drive shaft and the inner ends of said driven shafts; chain and sprocket connections between the outer ends of said driven shafts and said wheels; a fifth wheel connecting said main frame to said unit frame so that the latter is rotatable about a vertical axis perpendicular to the horizontal axis of said mechanism; means on said main frame and connected with said unit frame for rotating the latter to effect steering of said unit; and a motor mounted on said main frame and so operatively connected to said drive shaft as to drive the latter in any steering position of said unit, said drive shaft extending vertically upwardly from said mechanism and located in the axis of the said fifth wheel.

HENRY C. HARBERS.